United States Patent
Cho

(10) Patent No.: US 7,336,437 B2
(45) Date of Patent: Feb. 26, 2008

(54) APPARATUS, MEDIUM, AND METHOD FOR PROTECTING A STORAGE MEDIUM IN A PORTABLE DEVICE

(75) Inventor: Hyung-joon Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/201,120

(22) Filed: Aug. 11, 2005

(65) Prior Publication Data

US 2006/0044668 A1 Mar. 2, 2006

(30) Foreign Application Priority Data

Aug. 11, 2004 (KR) ...................... 10-2004-0063096

(51) Int. Cl.
*G11B 21/02* (2006.01)
*G11B 19/02* (2006.01)

(52) U.S. Cl. .......................................... 360/75; 360/69

(58) Field of Classification Search ..................... None
See application file for complete search history.

(56) References Cited

U.S. PATENT DOCUMENTS

2002/0126411 A1* 9/2002 Ito .............................. 360/75
2004/0125493 A1* 7/2004 Shimotono et al. ........... 360/75

FOREIGN PATENT DOCUMENTS

| JP | 2002-259066 | 9/2002 |
|---|---|---|
| JP | 2003-263853 | 9/2003 |
| KR | 10-2005-0017248 | 2/2005 |

OTHER PUBLICATIONS

Korean Office Action dated Feb. 6, 2006 for Korean App. No. 10-2004-0063096.

* cited by examiner

*Primary Examiner*—Andrew L. Sniezek
(74) *Attorney, Agent, or Firm*—Staas & Halsey LLP

(57) ABSTRACT

A method, medium, and apparatus protecting a portable device protecting a HDD by instituting different protection mechanisms to an information processing apparatus based on a portable state/non-portable state of the portable device. The protecting of the HDD may include detecting whether the portable device is carried, detecting a movement of the portable device, comparing by applying a different critical value, based on whether the portable device is carried, in judging whether to unload the HDD through a comparison of the degree of movement of the portable device with a critical value, and performing an unload of the HDD based on results of the comparison. The method for protecting a HDD of a portable device efficiently protects the HDD and guarantees an optimized performance of the portable device by protecting the HDD by instituting different mechanisms depending on a portable/non-portable state of the portable device.

19 Claims, 7 Drawing Sheets

APPARATUS, MEDIUM, AND METHOD FOR PROTECTING A STORAGE MEDIUM IN A PORTABLE DEVICE

CROSS-REFERENCE TO RELATED APPLICATIONS

This application claims the benefit of Korean Patent Application No. 2004-63096, filed on Aug. 11, 2004, in the Korean Intellectual Property Office, the disclosure of which is incorporated herein in its entirety by reference.

BACKGROUND OF THE INVENTION

1. Field of the Invention

Embodiments of the present invention relate to an apparatus and method, e.g., a portable mobile device, protecting a recording and/or reproducing apparatus, and more particularly, to a portable mobile device and method protecting a hard disk drive (HDD) thereof, wherein a protection mechanism for an information processing unit is differently applied based on a portable state/non-portable state in the portable mobile device.

2. Description of the Related Art

As an example, a portable mobile device can include a notebook computer, an MP3 player, a digital camera, and a cellular phone, etc. Recently products have included information processing units, such as hard disk drives (HDDs) optical disk drives (ODDs), for example, in order to improve information storage capabilities.

However, a characteristic of the portable mobile device is that the portable mobile device is frequently moved. Further, there is always the potential of the portable mobile device falling and impacting a surface with sufficient force to damage the information processing unit. Additionally, HDDs have the disadvantage that their heads and disks are more vulnerable to such impacts.

Therefore, in a portable mobile device having a HDD it is desirable to protect the HDD from a movement that may damage the HDD or which may be representative of an acceleration, e.g., a falling, that may indicative of potential damage to the HDD.

When a head is positioned on a disk of a HDD, an air bearing is formed between a slider and the disk by air pressure of the rotating disk. Thanks to the air bearing, the slider can fly on the disk in a floating state.

During such a floating state, a motion of the head in a vertical direction at a center of the slider can be given by the following formula:

$$m \cdot \frac{d^2}{dt^2} z - \int\int (P - P_a) dx dy = -F_{s'}$$

Here, z is a movement amount in a vertical direction at the center of the slider, P is a pressure by Reynolds Equation, Pa is the ambient pressure, and m is a mass of the slider. If an impact greater than the design strength (Fsz) for the air bearing is applied to the HDD, the air bearing may be destroyed, causing the head and the disk to physically touch.

The air bearing of the slider in the HDD may be designed to prevent a physical contact between the head and the disk upon an impact of 200-300 G. Further, when the slider is positioned outside of the disk, with the heading being in an unloaded state, the head and the disk may be protected from an impact of more than 1000 G.

Therefore, protection from an impact is much greater when the head is unloaded from the disk rather than when the head is loaded on the disk.

FIGS. 1A and 1B schematically illustrate a loading/unloading of a head slider in a ramp loading type HDD. A ramp-loading type HDD 10 includes a ramp 6 and a projected portion 3b formed on an actuator 3. If an operating current is applied to a voice coil motor 5, the actuator 3 pivots along an operation axis 3a and the projected portion 3b slides across surfaces 6a through 6d of the ramp.

In FIG. 1A, an unloading direction is the clockwise moving direction of the actuator rotation and a loading direction is the counterclockwise moving direction of the actuator rotation. If the head slider 4 is unloaded and the actuator 3 is withdrawn from disk 1, the projected portion 3b formed on the actuator 3 first comes into contact with a parking surface 6d of the ramp. At this point, a coil supporting member 3c also touches or gets very close to an outer crash stop 7.

When the head slider 4 is loaded, the actuator 3 rotates to in the loading direction and transfers the head slider 4 onto the rotating disk 1. The projected portion 3b slides on the surfaces of the ramp 6, sequentially passes through the surfaces 6a through 6c of the ramp, and is finally detached from the inclined surface (parking surface) 6d.

Conversely, when the head slider 4 is unloaded, the actuator 3 rotates in the unloading direction and transfers the head slider 4 onto the rotating parking position 6d. The projected portion 3b slides across the surfaces of the ramp 6 and sequentially passes through the surfaces 6a through 6c of the ramp and comes into contact with the parking surface 6d.

In the meantime, unloading a head of a HDD based on whether a portable mobile device is carried, is known.

In particular, FIG. 2 schematically illustrates a method for protecting a HDD, in a portable mobile device including the HDD. FIG. 2 illustrates U.S. Patent Publication No. 2002-0126411, in which whether a cellular phone and a digital camera are carried is detected using a detection mechanism, and if the portable mobile device is not carried, the HDD is unloaded.

Referring to FIG. 2, when a cellular phone 20 is in a portable state, a HDD 10 normally operates. For example, the HDD 10 can perform its normal operations of recording and/or playing information to/from the hard disk. Conversely, when the cellular phone 20 is in a non-portable state, the HDD 10 is unloaded for its protection.

Whether the cellular phone 20 is carried is detected by an electrostatic detection sensor 21, with a control circuit 25 generating a control signal S controlling load/unload of the HDD 10 based on the detection results of the electrostatic detection sensor 21.

FIG. 3 illustrates an example of such an electrostatic detection sensor. The electrostatic detection sensor, as shown in FIG. 2, judges whether the portable device is within proximity of a human body, i.e., whether the apparatus is being carried, using an intensity of an electrostatic potential between electrodes A and B.

The detecting of such a potentiality an impact, a falling down, a vibration, and corresponding unloading of a head of a HDD, if necessary, in order to secure safety of the HDD are known.

In particular, such technology is intended to protect a HDD from impact, a fall, and vibrations, as disclosed in Japanese Patent Publication Nos. 2000-99182 (published as of Apr. 7, 1999) and 2002-8336 (published as of Jan. 11, 2002).

FIG. 4 illustrates a typical HDD protection circuit using an acceleration sensor. More specifically, FIG. 4 illustrates the HDD protection circuit disclosed in Japanese Patent Publication No. 2003-263853. Referring to FIG. 4, a head collision prevention circuit 42 detects whether a movement speed of a HDD is faster than a critical speed, and an actuator operating circuit 44 controls whether a HDD is unloaded based on detection results of the head collision prevention circuit 42.

FIG. 5, similarly, further illustrates the acceleration sensor shown in FIG. 4. The acceleration sensor 50 can include a pendulum 52 and a piezo element 54 attached to the pendulum 52. The pendulum 52 may be moved in x, y, or z directions depending on movement of a HDD, and an intensity of an electrical signal detected by the piezo element 54 varies as the pendulum 52 moves. Accordingly, it is possible to compute the degree of a movement of the pendulum 52 in x, y, or z directions using the electrical signal from the piezo element 54.

An important desire of a portable mobile device including a HDD is to efficiently protect the HDD as well as guaranteeing optimum performance of the HDD.

Since it may be impossible to take measures whatsoever before an impact is applied when using simply a shock sensor, it is difficult to efficiently protect a HDD against such an impact. Conversely, using an acceleration sensor, it is possible to estimate the protection need of a HDD using the falling speed and moving speed, e.g., before impact. Accordingly, using the acceleration sensor is more effective than the shock sensor.

However, even though it may be judged that a protection measure needs to be implemented for protection of the HDD, based on the acceleration sensor, such a measure may deteriorate operation performance of a portable mobile apparatus if the protection measure is indiscriminately applied without consideration as to a portable state or a non-portable state of the portable mobile device.

For example, if a portable mobile device is being carried, even if movement of some extent is indicated, there exists only an extremely small probability that a corresponding impact or fall may actually reach a level sufficient to cause damage to the HDD. Therefore, in that case, to guarantee operation performance of the HDD, it may be more beneficial to delay an unloading of the HDD. Further, with consideration of the above-described context, it may also be understandable that operation performance may not be guaranteed if a HDD is unloaded due merely because the portable mobile device is not being currently carried.

Therefore, there is a need for an improved method for taking measures to protect a HDD based on whether a portable device is carried and the degree of a movement to guarantee operation performance and safety at the same time in the portable mobile device.

SUMMARY OF THE INVENTION

Embodiments of the present invention provides an improved method, medium, and apparatus pursuing operation performance and effective protection measures by applying different protection mechanisms for protecting a HDD based on whether a portable device is being carried and the degree of a movement in the portable device.

To achieve the above and/or other aspects and advantages, embodiments of the present invention include a method protecting a HDD (hard disk drive) of a portable device, including detecting whether the portable device is currently carried, detecting a degree of movement of the portable device, comparing the degree of movement with a critical value, of a plurality of critical values, with selection of the critical value from the plurality of critical values being based on whether the portable device is currently carried, to judge whether to unload the HDD, and performing an unload of the HDD based upon the judgment to unload the HDD.

In the comparing, the critical value is the first critical value for a portable state of the portable device, and the critical value is a second critical value for a non-portable state of the portable device, with the second critical value having a smaller value than the first critical value. The method may further include judging a movement frequency of the portable device, and the critical value may be the second critical value based on the movement frequency defining the non-portable state of the portable device.

The detecting of whether the portable device is carried can be performed using an electrostatic detection sensor judging whether the portable device is in a vicinity to a body. The detecting of whether the portable device is carried may also be performed using a hanging detection sensor judging whether the portable device is carried by being hung.

To achieve the above and/or other aspects and advantages, embodiments of the present invention include a method protecting a HDD (hard disk drive) of a portable device, including detecting whether the portable device is currently carried, detecting a degree of movement of the portable device based on whether the portable device is currently carried, comparing the degree of movement with a critical value to judge whether to unload the HDD, and performing an unload of the HDD based upon the judgment to unload the HDD.

The comparing may include amplifying the degree of movement, according to a first amplification characteristic corresponding to a portable state of the portable device, and according to a second amplification characteristic corresponding to a non-portable state of the portable device having a smaller amplification gain than the first amplification characteristic, the portable state and non-portable state being determined by whether the portable device is currently carried, wherein a result of the amplification is compared with the critical value.

To achieve the above and/or other aspects and advantages, embodiments of the present invention include an apparatus to protect a HDD (hard disk drive) of a portable device, including a sensor to detect whether the portable device is currently carried, an acceleration sensor to detect a degree of movement of the portable device, and a comparator for comparing the degree of movement with a critical value, of a plurality of critical values, with selection of the critical value from the plurality of critical values being based on whether the portable device is currently carried, to judge whether to unload the HDD.

The comparator may include critical value setting resistances including first and second resistances connected in series between a Vs (voltage source) and a ground voltage, and a third resistance selectively connected in parallel between the Vs and a node between the first and second resistances, wherein whether to connect the third resistance is selectively controlled by an output of the sensor, and an operation amplifier having an input connected with the node between the first and the second resistances and another input connected with the acceleration sensor.

The sensor is an electrostatic detection sensor for judging whether the apparatus is touched to a body. The sensor may also be a hanging detection sensor for judging whether the apparatus is carried by being hung on a portable strap.

To achieve the above and/or other aspects and advantages, embodiments of the present invention include an apparatus to protect a HDD (hard disk drive) of a portable device, including a sensor to detect whether the portable device is currently carried, an acceleration sensor to detect a degree of movement of the portable device based on whether the portable device is currently carried, and a comparator for comparing the degree of movement with a critical value to judge whether to unload the HDD.

The comparator may include first and second resistances connected in series between a Vs (voltage source) and a ground potential, an amplifier to amplify an output of the acceleration sensor according to a first amplification characteristic corresponding to a portable state of the portable device, and according to a second amplification characteristic corresponding to a non-portable state of the portable device, the second amplification characteristic having a smaller amplification gain than the first amplification characteristic, and an operation amplifier having an input connected with a node between the first and second resistances and another input connected with the amplifier.

To achieve the above and/or other aspects and advantages, embodiments of the present invention include a portable device including a storage medium and a storage medium protection apparatus according to embodiments of the present invention. The storage medium may be a hard disk drive.

To achieve the above and/or other aspects and advantages, embodiments of the present invention include at least one medium including computer readable code to implement embodiments of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1A:
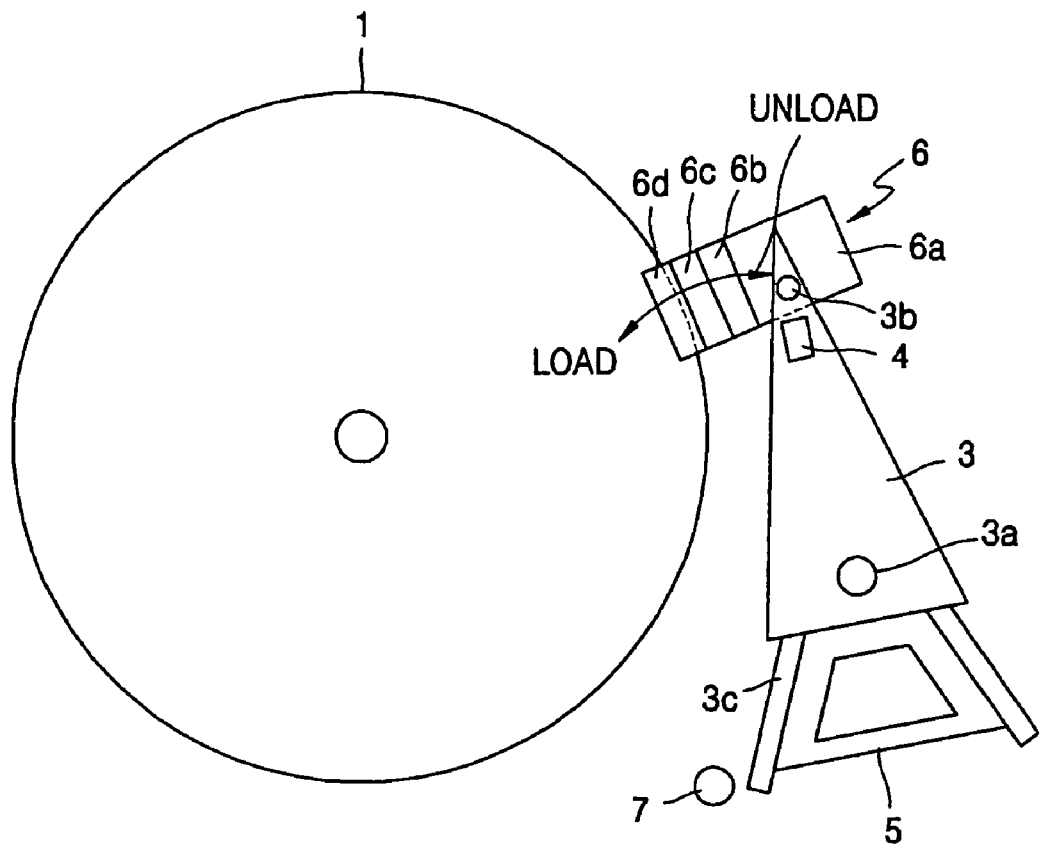
FIGS. 1A and 1B illustrate a loading/unloading of a head slider in a ramp loading type hard disk drive.
Figure 1B:
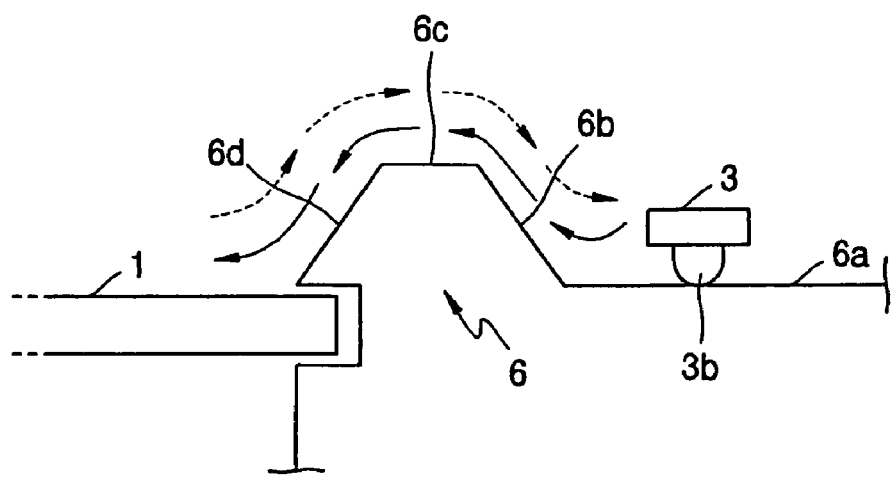

Reference will now be made in detail to embodiments of the present invention, examples of which are illustrated in the accompanying drawings, wherein like reference numerals refer to the like elements throughout. The embodiments are described below to explain the present invention by referring to the figures.

In a method for protecting a HDD, according to an embodiment of the present invention, a critical value identifying the level at which a protection measure for a HDD should be implemented depends on a portable device's movement, with the critical value being varied based on whether the portable device is currently being carried.

Figure 6:
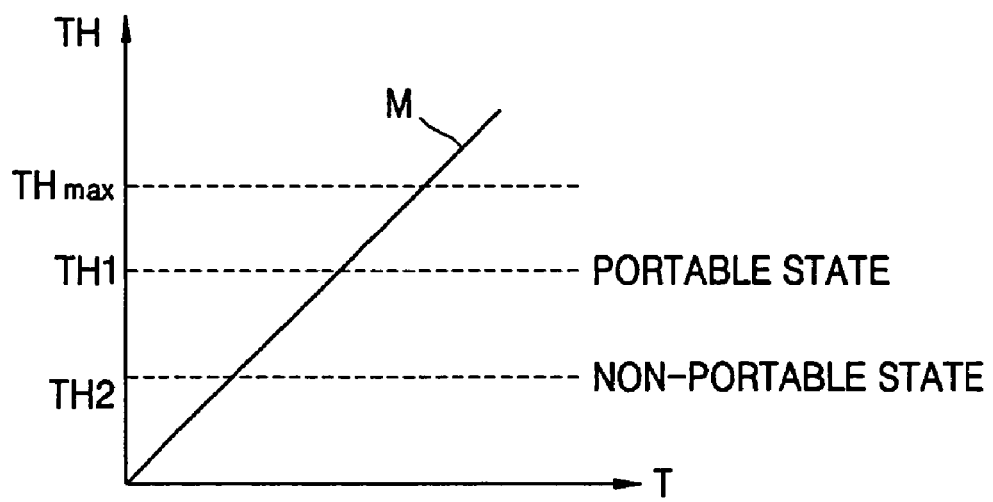
FIG. 6 illustrates a method for protecting a HDD of a portable device, according to an embodiment of the present invention.

FIG. 6 illustrates a method for protecting a HDD of a portable device, according to an embodiment of the present invention.

Referring to FIG. 6, a maximum critical value, a first critical value, and a second critical value are shown. Here, the maximum critical value $TH_{max}$ is a value that depends on an impact resistance characteristic of a HDD. That is, the maximum critical value $TH_{max}$ identifies the impact level at which a HDD in operation may be damaged.

The first critical value TH1 is smaller than the maximum critical value $TH_{max}$, and a difference between them can be influenced by the speed with which unload can be performed in a HDD. That is, presuming that the speed at which a portable device moves increases constantly, the first critical value TH1 may be a value to use in judging the appropriate time point at which a HDD should be unloaded before the moving speed of the portable device reaches the maximum critical value.

In the meantime, the second critical value TH2, smaller than the first critical value TH1, may depend on the movement frequency of the portable device, as further described below.

Here, the first critical value TH1 can be a value that corresponds to a portable state of the portable device and the second critical value TH2 can be a value that corresponds to a non-portable state of the portable device.

If the portable device is in a non-portable state, there is a high probability that a degree of a movement, once initiated, will increase constantly to such an extent that a HDD may be damaged. That is, if the portable device is in a non-portable state, a user cannot control a falling of the portable device and a time during which the apparatus falls is expected to be considerably short. Therefore, in that case, the portable device may be required to start an unload operation of a HDD as soon as possible. Therefore, there are occasions when it may be desirable to have an unload operation of a HDD started, even if a relatively small movement is detected, by applying the lowest second critical value TH2.

Conversely, if the portable device is in a portable state, there is a low possibility that the degree of a movement will increase constantly to such an extent that a HDD will be damaged. That is, if portable device is in a portable state, the user can typically control any falling of the portable device and the time during which the portable device falls can be expected to be long. Therefore, in that case, a delay of an unload operation of a HDD may be beneficial. Accordingly, it may be desirable to have an unload operation of a HDD initiated when a relatively large movement is detected by use of the first critical value TH1, rather than the second critical value TH2.

The critical value used in determining whether to unload a HDD can be determined based on whether a portable device is carried and by the degree of the portable device's movement. Here, whether the portable apparatus is carried can be detected using an electrostatic detection sensor judging whether the portable device is in the general vicinity of a human body or through a hanging detection sensor judging whether the portable device is hung. In the meantime, degree of the portable mobile apparatus' movement is detected by an acceleration sensor.

As only an example, setting the critical value based on whether the portable mobile apparatus is carried can be accomplished by changing the critical value or by changing a nonlinearly an amplification gain of an amplifier amplifying a detection result of an acceleration sensor. Noting that additional embodiments are also available.

Figure 7:
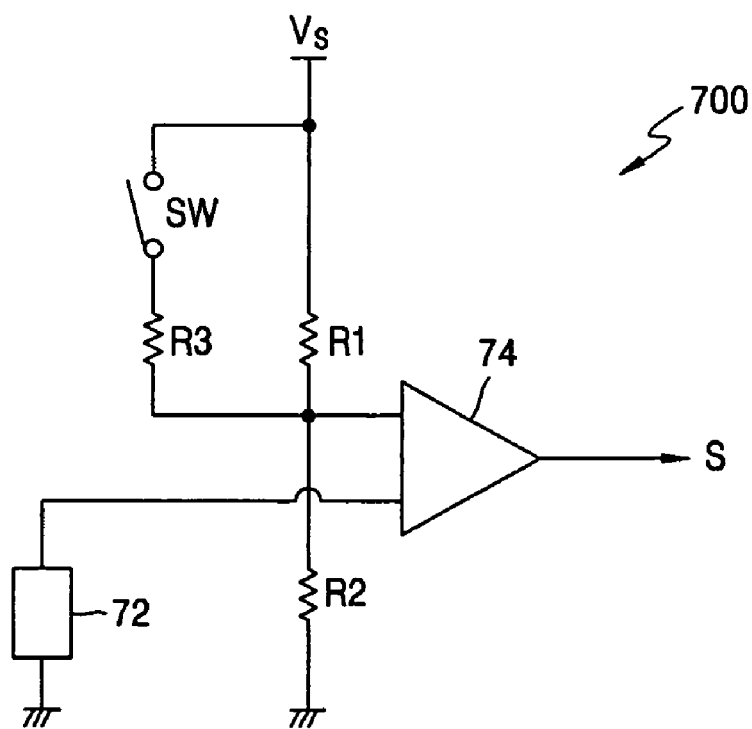
FIG. 7 illustrates a comparator determining whether a HDD should be unloaded based on whether a portable device is carried, according to an embodiment of the present invention.

FIG. 7 illustrates a comparator determining whether a HDD should be unloaded based on whether a portable device is carried, according to an embodiment of the present invention. The comparator 70 shown in FIG. 7 can include an operation amplifier 74 comparing an electrical signal M, detected by the acceleration sensor 72, with one of the first and the second critical values TH1 or TH2, as set by critical value setting resistances R1, R2, and R3.

The first and the second resistances R1 and R2, among the critical value setting resistances R1, R2, and R3, can be connected in serial between Vs and a ground potential, and with the third resistance R3 being selectively connected in parallel between Vs and a node between the first and the second resistance R1 and R2. Whether to connect the third resistance R3 in parallel can be controlled by a switch SW, for example. The switch SW can operate in response to a signal from the electrostatic detection sensor or the hanging detection sensor. Additional critical value setting unit are also available, noting that embodiments of the present invention are not limited by those described herein.

If the third resistance R3 is not connected in parallel, i.e., the portable device is in a non-portable state, the second critical value TH2 becomes Vs×R2/(R1+R2). Conversely, if the third resistance R3 is connected in parallel, i.e., the portable device is in a portable state, the first critical value TH1 becomes Vs×R2/((R1//R3)+R2). Here, R1//R3 represents a parallel resistance for R1 and R3. Since R1//R3 is smaller than R1, TH1 will be greater than TH2.

Figure 8:
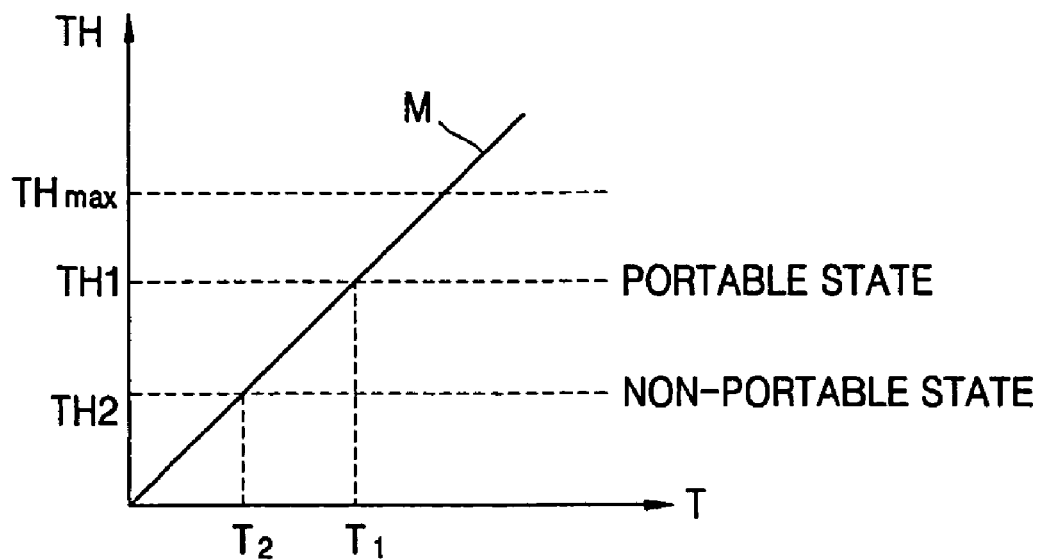
FIG. 8 graph illustrates a change in a critical value under a portable/non-portable state in a hard disk drive, according to an embodiment of the present invention.

FIG. 8 graphically illustrates a change in a critical value under a portable/non-portable state. In the comparator shown in FIG. 7, M is an output of the acceleration sensor 72 and is compared with the first critical value TH1 or the second critical value TH2, as set by the resistances R1, R2, and R3.

The second critical value TH2 is smaller than the first critical value TH1. Thus, if the critical value TH2 is utilized, an unloading operation of a HDD is initiated in response to less movement than if the first critical value TH1 is utilized. Here, an unloading operation of the HDD may be started more early (T2<T1) in response to movement increasing at a constant rate.

That is, if the portable device is in a non-portable state, unloading operation can be started more early in response to a smaller movement, compared with a non-portable state.

Figure 9:
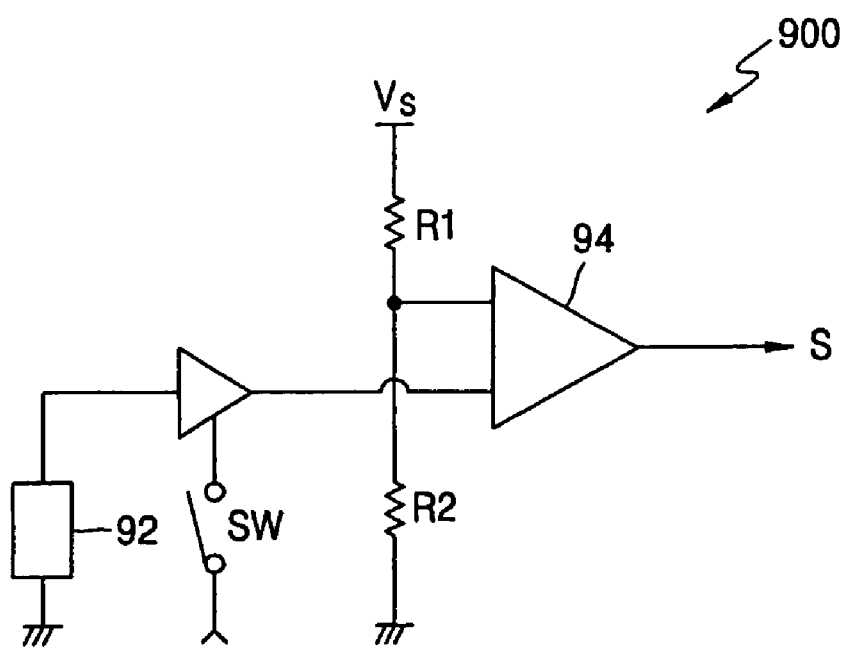
FIG. 9 illustrates another comparator determining whether a HDD should be unloaded based on whether a portable device is carried, according to an embodiment of the present invention.

FIG. 9 illustrates another comparator determining whether a HDD should be unloaded based on whether a portable device is carried, according to an embodiment of the present invention.

The comparator 900, shown in FIG. 9 can includes an amplifier 96 for amplifying an electrical signal M detected by the acceleration sensor 92, using different amplifying characteristics, and an operation amplifying 94 comparing an output of the amplifier 96 with the critical value TH set by the critical value setting resistances R1 and R2.

Here, the amplifier 96 can perform a nonlinear amplifying operation with its amplification gain being determined by either of two different nonlinear amplifying characteristics, for example. The different nonlinear amplifying characteristics may, accordingly, be selected based on whether the portable device is carried or not, i.e., in a portable or non-portable state.

If the portable device is in a non-portable state, the amplifier 96 may be set to have a higher amplifying characteristic. Conversely, if the portable mobile apparatus is in a portable state, the amplifier 96 may be set to have a lower amplifying characteristic.

Figure 10:
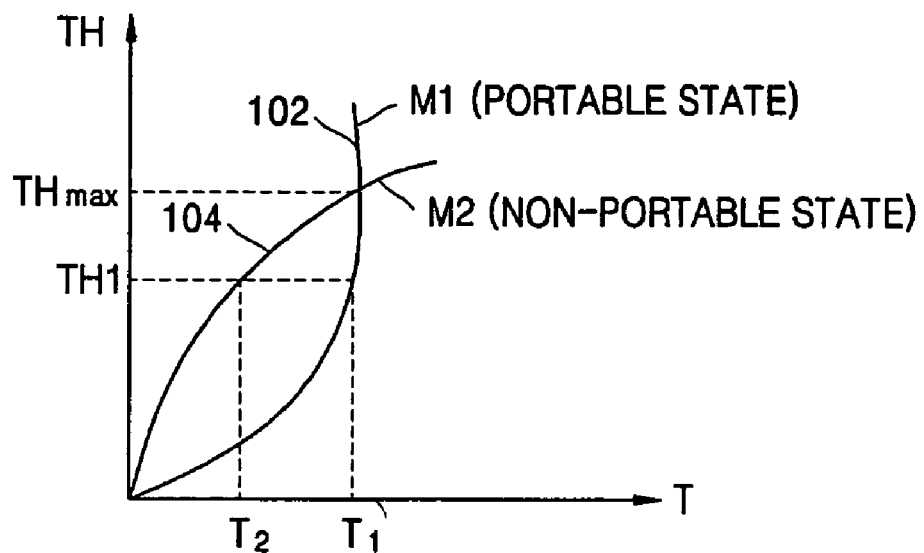
FIG. 10 graph illustrates a change in an amplification characteristic for an amplifier under a portable/non-portable state, such as in an apparatus shown in FIG. 9, according to an embodiment of the present invention.

FIG. 10 graphically illustrates a change in amplification characteristics of an amplifier under portable/non-portable states. In the comparator of FIG. 9, M is an output from acceleration sensor 92 and is amplified by the amplifier 96 to have different amplification characteristics depending on whether the portable device is carried or not, for example.

In FIG. 10, curves 102 and 104 illustrate respective first and second amplifying characteristics, noting that the first and the second characteristic are all nonlinear and that the first amplifying characteristic of acceleration sensor output M1 has a lower amplification gain compared with the second amplification characteristic of acceleration sensor output M2.

The first amplification characteristic corresponds to the portable device being in a portable state and the second amplification characteristic corresponds to the portable device being in a non-portable state.

Again, the first amplification characteristic has a lower amplification gain than the second amplification characteristic. Thus, if the first amplification characteristic is applied, an unloading operation of a HDD will be initiated in response to smaller movement. Similarly, an corresponding unloading operation of a HDD will be started more early (T2<T1) in response to a movement that increases at a constant rate.

That is, if the portable device is in a non-portable state, the unloading operation may be started earlier in response to smaller movements compared with a portable state.

Figure 2:
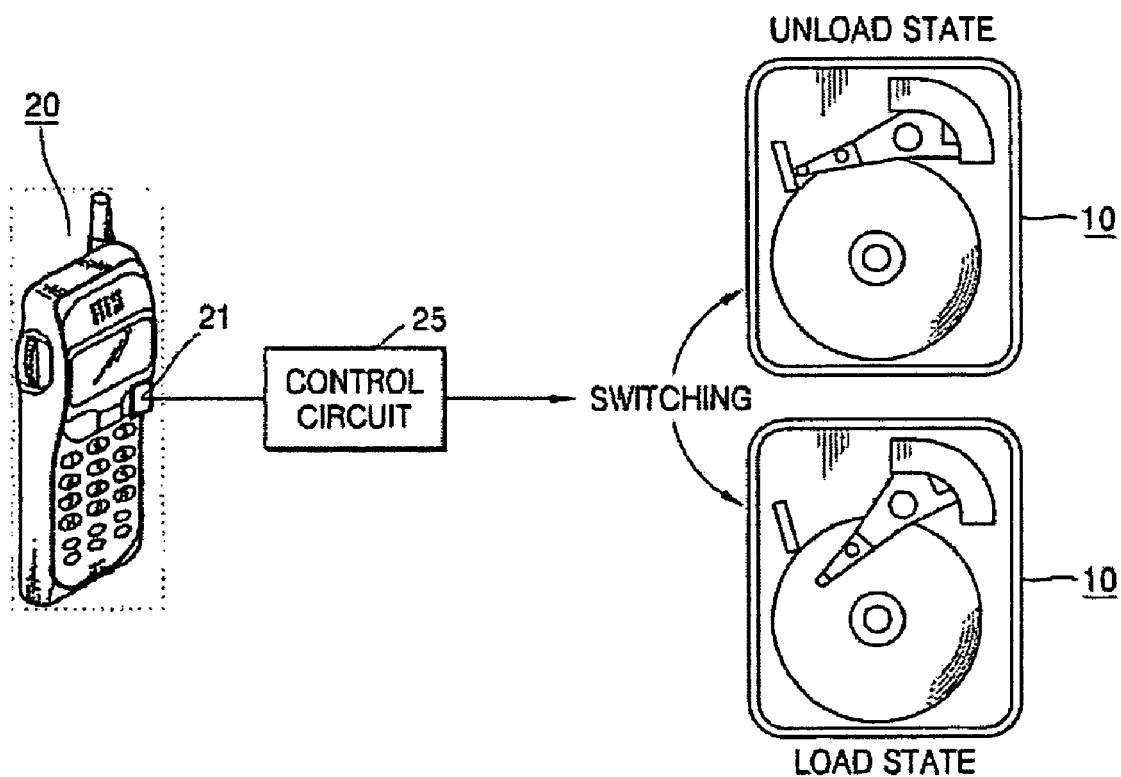
FIG. 2 illustrates a method for protecting a HDD in a portable device.
Figure 3:
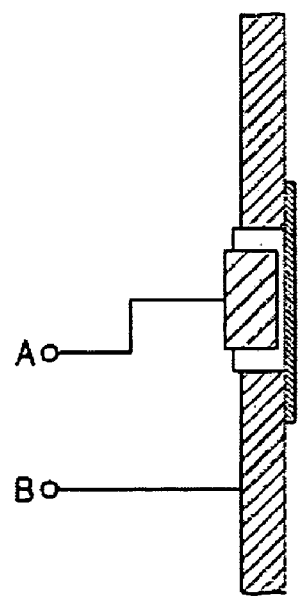
FIG. 3 illustrates an example of an electrostatic detection sensor.
Figure 4:
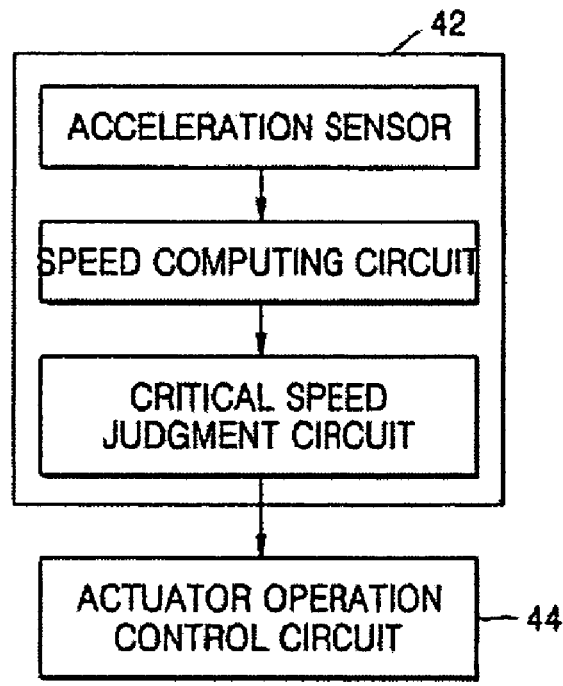
FIG. 4 illustrates a HDD protection circuit using an acceleration sensor.
Figure 5:
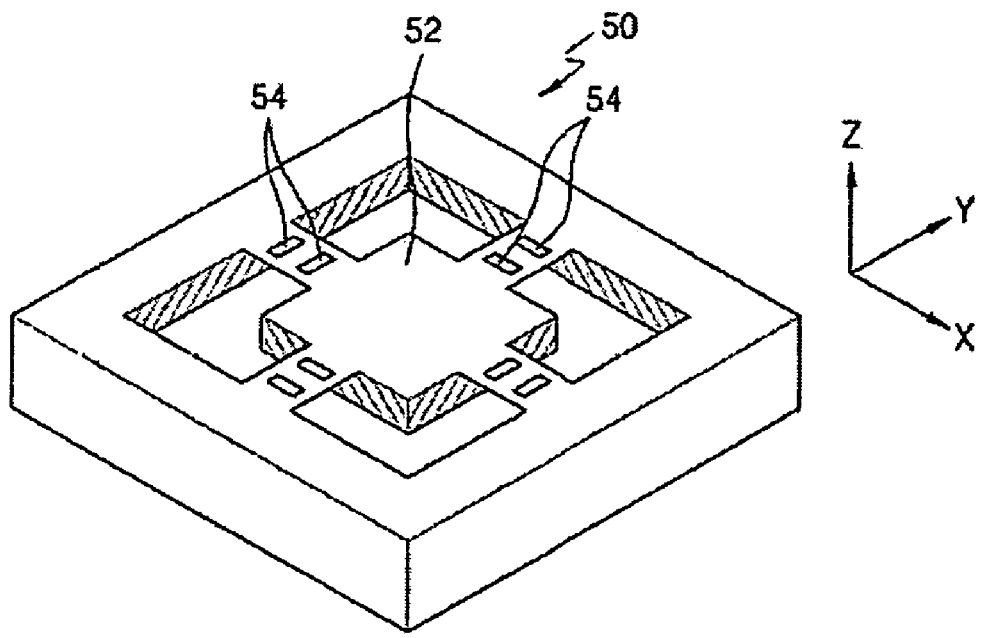
FIG. 5 illustrates an acceleration sensor, such as that shown in FIG. 4, according to an embodiment of the present invention.

In embodiments of the present invention, whether a portable device is carried can be detected based on an electrostatic detection sensor or a hanging detection sensor, for example. Here, since the electrostatic detection sensor is similar to that described with reference to FIGS. 2 and 3, detailed description thereof will further be omitted.

The hanging detection sensor can detect whether the portable device is hung on a portable strap, for example. A ring, on which a strap for a necklace or a wrist is bound, can be provided on a corner of a relatively small-sized portable device such as a cellular phone or an MP3 player, for example. Further, rings on a corresponding shoulder strap may be provided along both ends of a relatively middle-sized portable device, such as a digital moving image camera for example.

If the portable device is carried with a portable strap, the strap will receives a load based on the weight of the portable device. The hanging detection sensor can be installed so as to cooperate with the ring and detect whether the load is applied to the ring. That is, even if the portable device is not being directly held by a user, it can still be determined whether the portable mobile apparatus is being carried.

Figure 11:
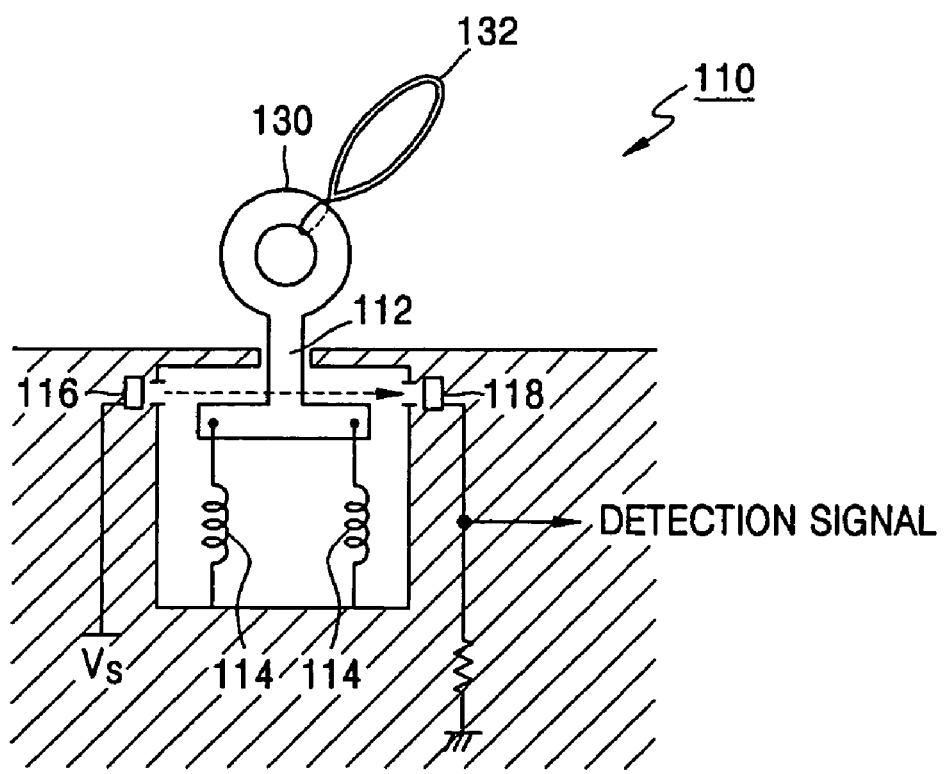
FIG. 11 illustrates a hanging detection sensor for protecting a HDD, according to an embodiment of the present invention.

FIG. 11 illustrates a hanging detection sensor, according to an embodiment of the present invention. The hanging detection sensor 110 may include a bar 112 operating in cooperation with a ring 130, on which a portable strap is possibly bound, a spring 114 for supporting elasticity of the bar 112 and contracting to pull the bar 112 if a load is not applied to the ring 130, and a light emitting and receiving elements 116 and 118, an optical path between which is opened or closed depending on a position of the bar 112. Such a hanging detection sensor can be arranged to be implemented in the portable device.

If a load is applied to the ring 130, for example, the portable device can be considered to be carried using the portable strap 132. Accordingly, the ring moves to a direction opposite to a pulling direction of the spring 114, and thanks to movements of the ring 130 and the bar 112, in cooperation with the movement of the ring 130, an optical signal is prevented from passing between the light emitting and receiving elements 116 and 118.

Therefore, it is possible to determine the portable state of the portable device based on the portable device being hung on and carried with a strap, using the hanging detection sensor.

In embodiments of the present invention, the second critical value TH2 can also be modifiable by a user, for example, based on a movement frequency of a portable device, preventing a HDD from being frequently unloaded due to an extremely small movements of the portable device in a non-portable state, by changing a time point (T in FIGS. 6, 8, and 10, for example) when an unload of a HDD is initiated, again for example, based on a movement frequency of the portable device.

For example, if the portable device is contained in a pocket or a suitcase, i.e., not grasped directly by a user, it may be desirable to still regard such a state as a portable state to delay a time point at which an unload of a HDD starts. However, such a state cannot be detected by the electrostatic sensor or the hanging detection sensor as being the portable state. In that case, the portable device may be required to judge a movement frequency of the portable device and change the second critical value TH2 accordingly.

For that purpose, Japanese Patent Publication No. 2001-266466 discusses an impact detection apparatus dynamically changing an impact detection sensitivity (impact detection level) for an impact detection circumstance. That is, the apparatus of Japanese Patent Publication No. 2001-266466 responds to even to a small impact if an impact detection frequency is low, as is a case when a HDD initially operates, and fails to responds to a small impacts if an impact detection frequency is high.

Figure 12:
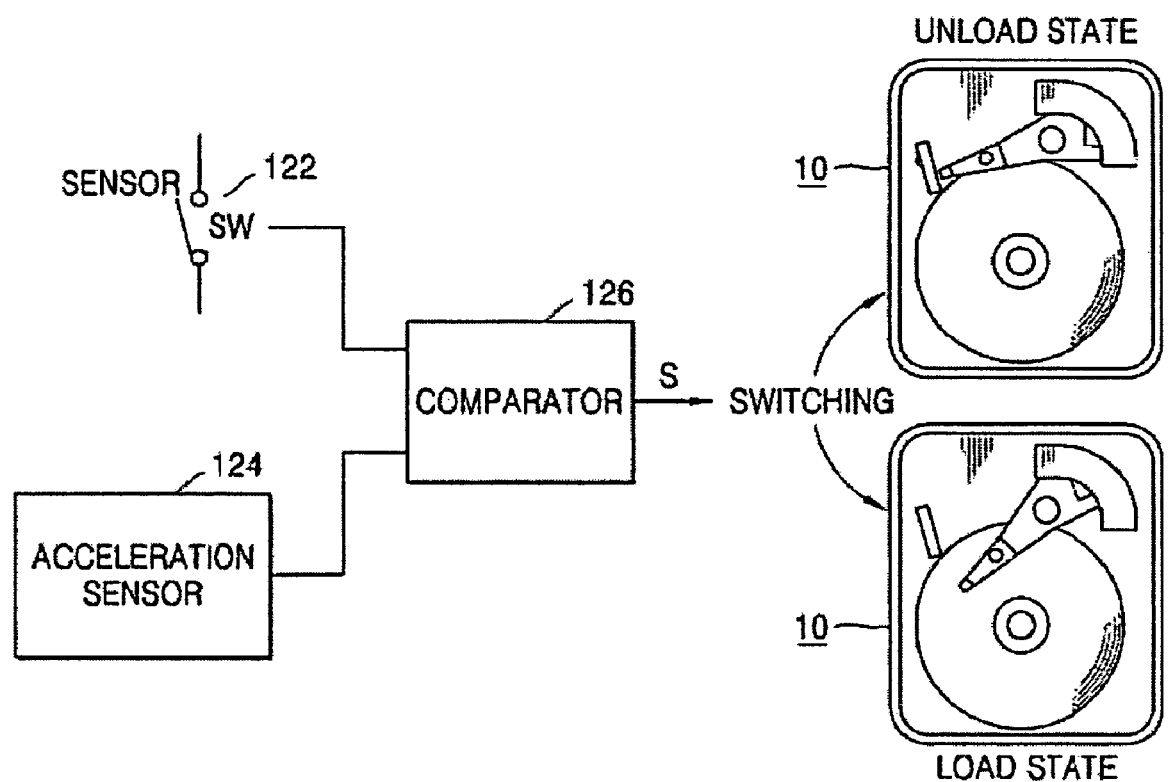
FIG. 12 is a block diagram illustrating an apparatus for protecting a portable device, according to an embodiment of the present invention.

FIG. 12 is a block diagram illustrating an apparatus for protecting the portable device, according to another embodiment of the present invention. The apparatus 120 may include a switch 122 judging whether the portable device is carried, an acceleration sensor 124 detecting a degree of the portable device's movement, and a comparator 126 determining whether to unload a HDD based on the judgment result of the switch 122 and the detection result of the acceleration sensor 124.

Here, the comparator 126 can judges whether to unload a HDD by comparing the degree of a movement of the portable mobile apparatus, detected by the acceleration sensor 124, with a critical value. If the apparatus is in a portable state as a result of the judgment, a high critical value is applied, and otherwise, a low critical value is applied, for example.

Since similar operation of the comparator 126 has previously been illustrated and described with reference to FIGS. 8 through 11, detailed description thereof will be further omitted.

Though embodiments of the present invention have been described using a HDD, as an example, it should be understood to a person of ordinary skill in the art that embodiments of the present invention can also be readily applied without much difficulty to an apparatus for operating a disk having tracks, such as an optical disk drive and an optical magnetic disk drive, noting that additional recording and/or reproducing apparatuses and storage devices are equally open to the present invention.

Embodiments of the present invention can be realized at least as a method, an apparatus, and a system. When the present invention is realized in the form of computer readable code, such as software, elements making up embodiments of the present invention may be code segments performing indispensably necessary jobs, and/or code segments performing dispensable unnecessary jobs. The computer readable code can be stored on a medium, such as a processor readable medium, or transmitted by signal, such as a computer data signal combined with a carrier wave, through a transmission medium or a communication network. The medium may include any type medium whatsoever as far as it can store and/or transmit information. Examples of the media include an electronic circuit, a semiconductor memory element, a read-only memory (ROM), a flash memory, an erasable ROM (EROM), a floppy disk, an optical disk, a hard disk, an optical fiber medium, or a radio frequency (RF) network, for example. The signal may include any-type signal whatsoever as long as it can propagate through a medium such as an electronic network channel, an optical fiber, an air, an electronic system, or an RF network, for example.

As described above, the protecting a HDD of a portable device, according to embodiments of the present invention, efficiently protects the HDD and guarantees an optimized performance of the portable device by protecting the HDD and instituting different mechanisms depending on a portable/non-portable state of the portable device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method protecting a HDD (hard disk drive) of a portable device, comprising:
   detecting whether the portable device is currently carried;
   detecting a degree of movement of the portable device;
   comparing the degree of movement with a critical value, of a plurality of critical values, with selection of the critical value from the plurality of critical values being based on whether the portable device is currently carried, to judge whether to unload the HDD; and performing an unload of the HDD based upon the judgment to unload the HDD, wherein in the comparing, the critical value is the first critical value for a portable state of the portable device, and the critical value is a second critical value for a non-portable state of the portable device, with the second critical value having a smaller value than the first critical value.

2. The method of claim 1, further comprising:

judging a movement frequency of the portable device; and the critical value is the second critical value based on the movement frequency defining the non-portable state of the portable device.

3. The method of claim 1 wherein the detecting of whether the portable device is carried is performed using an electrostatic detection sensor judging whether the portable device is in a vicinity to a body.

4. At least one medium comprising computer readable code to implement the method of claim 1.

5. A method protecting a HDD (hard disk drive) of a portable device, comprising:

detecting whether the portable device is currently carried;

detecting a degree of movement of the portable device;

comparing the degree of movement with a critical value, of a plurality of critical values, with selection of the critical value from the plurality of critical values being based on whether the portable device is currently carried, to judge whether to unload the HDD; and performing an unload of the HDD based upon the judgment to unload the HDD, wherein the detecting of whether the portable device is carried is performed using a hanging detection sensor judging whether the portable device is carried by being hung.

6. A method protecting a HDD (hard disk drive) of a portable device, comprising:

detecting whether the portable device is currently carried;

detecting a degree of movement of the portable device based on whether the portable device is currently carried;

comparing the degree of movement with a critical value to judge whether to unload the HDD; and performing an unload of the HDD based upon the judgment to unload the HDD, wherein the comparing comprises;

amplifying the degree of movement, according to a first amplification characteristic corresponding to a portable state of the portable device, and according to a second amplification characteristic corresponding to a non-portable state of the portable device having a smaller amplification gain than the first amplification characteristic, the portable state and non-portable state being determined by whether the portable device is currently carried, wherein a result of the amplification is compared with the critical value.

7. The method of claim 6 wherein the detecting of whether the portable device is carried is performed using an electrostatic detection sensor judging whether the portable device is in a vicinity to a body.

8. At least one medium comprising computer readable code to implement the method of claim 6.

9. A method protecting a HDD (hard disk drive) of a portable device, comprising:

detecting whether the portable device is currently carried;

detecting a degree of movement of the portable device based on whether the portable device is currently carried;

comparing the degree of movement with a critical value to judge whether to unload the HDD; and performing an unload of the HDD based upon the judgment to unload the HDD, wherein the detecting of whether the portable device is carried is performed using a hanging detection sensor judging whether the portable device is carried by being hung.

10. An apparatus to protect a HDD (hard disk drive) of a portable device, comprising:

a sensor to detect whether the portable device is currently carried;

an acceleration sensor to detect a degree of movement of the portable device; and a comparator for comparing the degree of movement with a critical value, of a plurality of critical values, with selection of the critical value from the plurality of critical values being based on whether the portable device is currently carried, to judge whether to unload the HDD, wherein the comparator comprises:

critical value setting resistances including first and second resistances connected in series between a Vs (voltage source) and a ground voltage, and a third resistance selectively connected in parallel between the Vs and a node between the first and second resistances, wherein whether to connect the third resistance is selectively controlled by an output of the sensor; and an operation amplifier having an input connected with the node between the first and the second resistances and another input connected with the acceleration sensor.

11. The apparatus of claim 10, wherein the sensor is an electrostatic detection sensor for judging whether the apparatus is touched to a body.

12. A portable device comprising a storage medium and the apparatus of claim 10.

13. The portable device of claim 12, wherein the storage medium is a hard disk drive.

14. An apparatus to protect a HDD (hard disk drive) of a portable device, comprising:

a sensor to detect whether the portable device is currently carried;

an acceleration sensor to detect a degree of movement of the portable device; and a comparator for comparing the degree of movement with a critical value, of a plurality of critical values, with selection of the critical value from the plurality of critical values being based on whether the portable device is currently carried, to judge whether to unload the HDD, wherein the sensor is a hanging detection sensor for judging whether the apparatus is carried by being hung on a portable strap.

15. An apparatus to protect a HDD (hard disk drive) of a portable device, comprising:

a sensor to detect whether the portable device is currently carried;

an acceleration sensor to detect a degree of movement of the portable device based on whether the portable device is currently carried; and a comparator for comparing the degree of movement with a critical value to judge whether to unload the HDD, wherein the comparator comprises:

first and second resistances connected in series between a Vs (voltage source) and a ground potential;

an amplifier to amplify an output of the acceleration sensor according to a first amplification characteristic corresponding to a portable state of the portable device, and according to a second amplification characteristic corresponding to a non-portable state of the portable device, the second amplification characteristic having a smaller amplification gain than the first amplification characteristic; and an operation amplifier having an input connected with a node between the first and second resistances and another input connected with the amplifier.

16. The apparatus of claim 15, wherein the sensor is an electrostatic detection sensor for judging whether the apparatus is touched to a body.

17. A portable device comprising a storage medium and the apparatus of claim 15.

18. The portable device of claim 17, wherein the storage medium is a hard disk drive.

19. An apparatus to protect a HDD (hard disk drive) of a portable device, comprising:

a sensor to detect whether the portable device is currently carried;

an acceleration sensor to detect a degree of movement of the portable device based on whether the portable device is currently carried; and a comparator for comparing the degree of movement with a critical value to judge whether to unload the HDD, wherein the sensor is a hanging detection sensor for judging whether the apparatus is carried by being hung.

* * * * *

UNITED STATES PATENT AND TRADEMARK OFFICE
CERTIFICATE OF CORRECTION

PATENT NO. : 7,336,437 B2
APPLICATION NO. : 11/201120
DATED : February 26, 2008
INVENTOR(S) : Hyung-joon Cho It is certified that error appears in the above-identified patent and that said Letters Patent is hereby corrected as shown below:

Column 11, Line 14, change "claim 1" to --claim 1,--.

Column 11, Line 45, change "comprises;" to --comprises:--.

Column 11, Line 57, change "claim 6" to --claim 6,--.

Signed and Sealed this

Twenty-ninth Day of July, 2008

JON W. DUDAS
*Director of the United States Patent and Trademark Office*